United States Patent [19]
Ohtsubo et al.

[11] Patent Number: 6,114,818
[45] Date of Patent: Sep. 5, 2000

[54] MOTOR CONTROL APPARATUS

[75] Inventors: Toshihiko Ohtsubo, Numazu; Michio Kawase, Mishima; Kazuyoshi Suzuki, Numazu; Takahiro Watanabe, Shizuoka-ken; Jun Yamaguchi, Numazu; Tetsuro Fukusaka, Susono, all of Japan

[73] Assignee: Canon Kabushiki Kaisha, Tokyo, Japan

[21] Appl. No.: 09/210,905

[22] Filed: Dec. 16, 1998

[30] Foreign Application Priority Data

Dec. 22, 1997 [JP] Japan ................................ 9-353542

[51] Int. Cl.$^7$ ............................................. H02P 7/67
[52] U.S. Cl. ......................... 318/49; 318/85; 318/114
[58] Field of Search ........................ 318/34–113, 114

[56] References Cited

U.S. PATENT DOCUMENTS

| | | | |
|---|---|---|---|
| 4,227,126 | 10/1980 | Denecke | 318/55 |
| 4,308,489 | 12/1981 | Bergmann | 318/77 |
| 4,510,411 | 4/1985 | Hakamata et al. | 310/316 |
| 4,562,388 | 12/1985 | Wolf | 318/301 |
| 4,663,549 | 5/1987 | Suzuki | 310/62 |
| 5,117,753 | 6/1992 | Mamberer | 101/225 |
| 5,239,247 | 8/1993 | Habig et al. | 318/568.18 |
| 5,285,134 | 2/1994 | Kataoka | 318/116 |
| 5,440,212 | 8/1995 | Fukui | 318/116 |

FOREIGN PATENT DOCUMENTS

| | | |
|---|---|---|
| 0 369 331 | 5/1990 | European Pat. Off. |
| 58-014682 | 1/1983 | Japan |
| 59-204477 | 11/1984 | Japan |
| 60-176470 | 9/1985 | Japan |
| 63-001379 | 1/1988 | Japan |

OTHER PUBLICATIONS

Patent Abstracts of Japan, vol. 1997, No. 12, Dec. 25, 1997 (JP 09–224386).
Patent Abstracts of Japan, vol. 1997, No. 11, Nov. 28, 1997 (JP 09–191674).
Patent Abstracts of Japan, vol. 012, No. 200, Jun. 9, 1988 (JP 63–001379).

*Primary Examiner*—David Martin
*Assistant Examiner*—Rina I. Duda
*Attorney, Agent, or Firm*—Fitzpatrick, Cella, Harper & Scinto

[57] ABSTRACT

A motor control apparatus, which can control the speeds of a plurality of motors with nearly no speed variations until the final target speed is reached, includes a target speed setting circuit for dividing the speed range of the motors up to the final target speed into n steps (n is an integer and n≥2) to set a target speed, and setting the next divided target speed after all the motors have reached the current divided target speed.

29 Claims, 7 Drawing Sheets

MOTOR CONTROL APPARATUS

BACKGROUND OF THE INVENTION

1. Field of the Invention

The present invention relates to a motor control method and motor control apparatus for controlling a plurality of motors, and an image forming apparatus.

2. Related Background Art

A conventional motor control apparatus, which is required to synchronously rotate and stop a plurality of motors, normally uses motors which are controlled by an identical control method and have relatively small variations in rotation characteristics due to their individual differences, for example, pulse motors, DC motors, and the like.

For example, in an image forming apparatus using electrophotography, a motor for driving a photosensitive element as an image carrier and a motor for driving a convey means for conveying a transfer element such as a recording sheet or the like to the transfer position of the photosensitive element must be synchronously rotated not only during transfer for transferring a toner image on the photosensitive element onto the transfer element but also at the beginning or end (stop) of rotation of the photosensitive element. In such case, since motors, which are controlled by an identical control method and have relatively small variations in rotation characteristics due to their individual differences are used, synchronous control of these motors is relatively easy.

On the other hand, especially in an image forming apparatus using electrophotography, a motor with high rotation precision is required to drive the photosensitive element or transfer element so as to form a high-resolution image. To meet such a requirement, the following technique has been proposed. For example, a vibration wave motor that is a vibration type motor is used as one of the motors for driving the photosensitive element or transfer element together with other motors controlled by a different control method.

As proposed by Japanese Patent Application Laid-Open No. 58-14682, a vibration-type motor excites a plurality of vibrations at frequencies beyond the audible range in a vibration member, and obtains a driving force by synthesizing these vibrations. As for its driving performance, the vibration type motor realizes stable rotation at a constant speed, as described in detail in Japanese Patent Application Laid-Open Nos. 63-1379, 60-176470, 59-204477, and the like.

However, the vibration type motor suffers variations in its rotation characteristics due to individual differences in the motors, and the driving frequency and voltage and the pulse width of the driving voltage must be periodically adjusted in correspondence with a signal output from a speed detection means, such as an encoder signal, so as to maintain stable rotation.

When a plurality of vibration-type motors or a vibration-type motor and a motor controlled by a different control method are synchronously controlled, these motors engage in synchronous rotation along different speed transition curves depending on the individual differences in their rotation characteristics or different control methods for the individual motors, especially at the beginning and stopping of rotation.

During this transition period, since a relative speed is produced among the elements to be driven by these motors, friction is produced among these elements to be driven, resulting in wears or damage to the elements to be driven.

Figure 10:
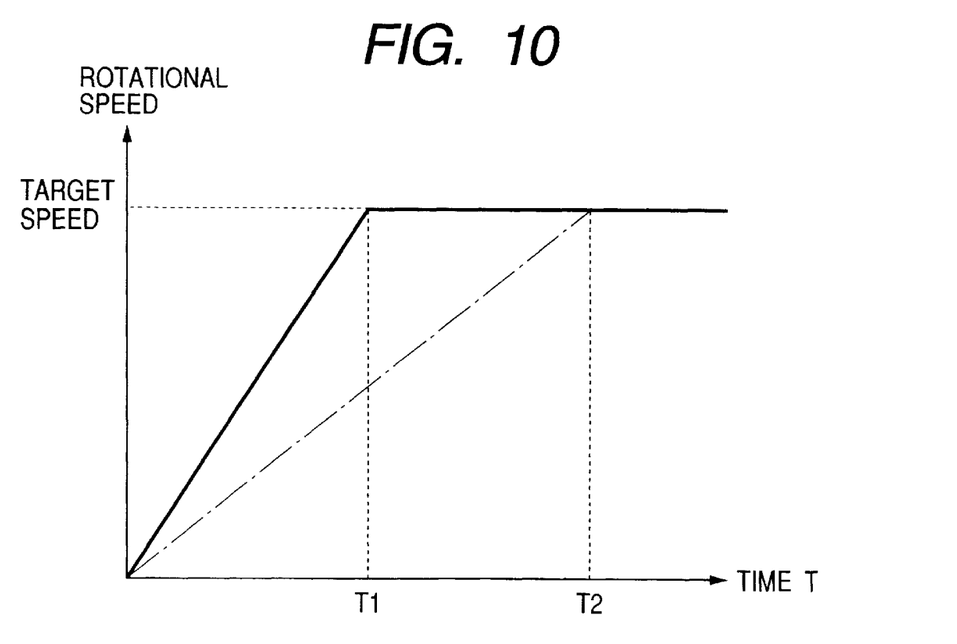
FIG. 10 is a graph showing variations in start up time due to variations of motors.

More specifically, the time for start up operation commonly varies due to variations of the motors, as shown in FIG. 10. In case of FIG. 10, the times required for the motor to reach a target speed have a time difference T2−T1 between two motors, and the difference in the total moving amount corresponds to the area bounded by the solid curve and one-dashed chain curve. Hence, the speed difference between the motors increases upon start up unless the start up operations of the motors are controlled, and may promote wear of the elements to be driven.

SUMMARY OF THE INVENTION

One aspect of the application is to provide a motor control apparatus which can control the speeds of a plurality of motors with nearly no speed variations until they reach a final target speed.

One aspect of the application is to provide an image forming apparatus, which can control the speeds of photosensitive drums as a plurality of image carriers, and the speed of transfer element convey means for conveying a transfer element to a transfer position of each photosensitive drum with nearly no speed variations until they reach a final target speed.

One aspect of the application is to provide a control apparatus for controlling speeds of a plurality of motors to a target speed on the basis of speed data of the plurality of motors detected by speed detection means, comprising target speed setting means for setting target speeds by dividing speed ranges until a final target speed of the plurality of motors into n steps (n is an integer within the range $n \geq 2$), and control means for controlling the speeds stepwise until the final target speed while adjusting the speeds of the plurality of motors to the divided target speeds set by the target speed setting means.

Other objects of the present invention will become apparent from the following description of the embodiments taken in conjunction with the accompanying drawings.

DESCRIPTION OF THE PREFERRED EMBODIMENTS (First Embodiment)

Figure 1:
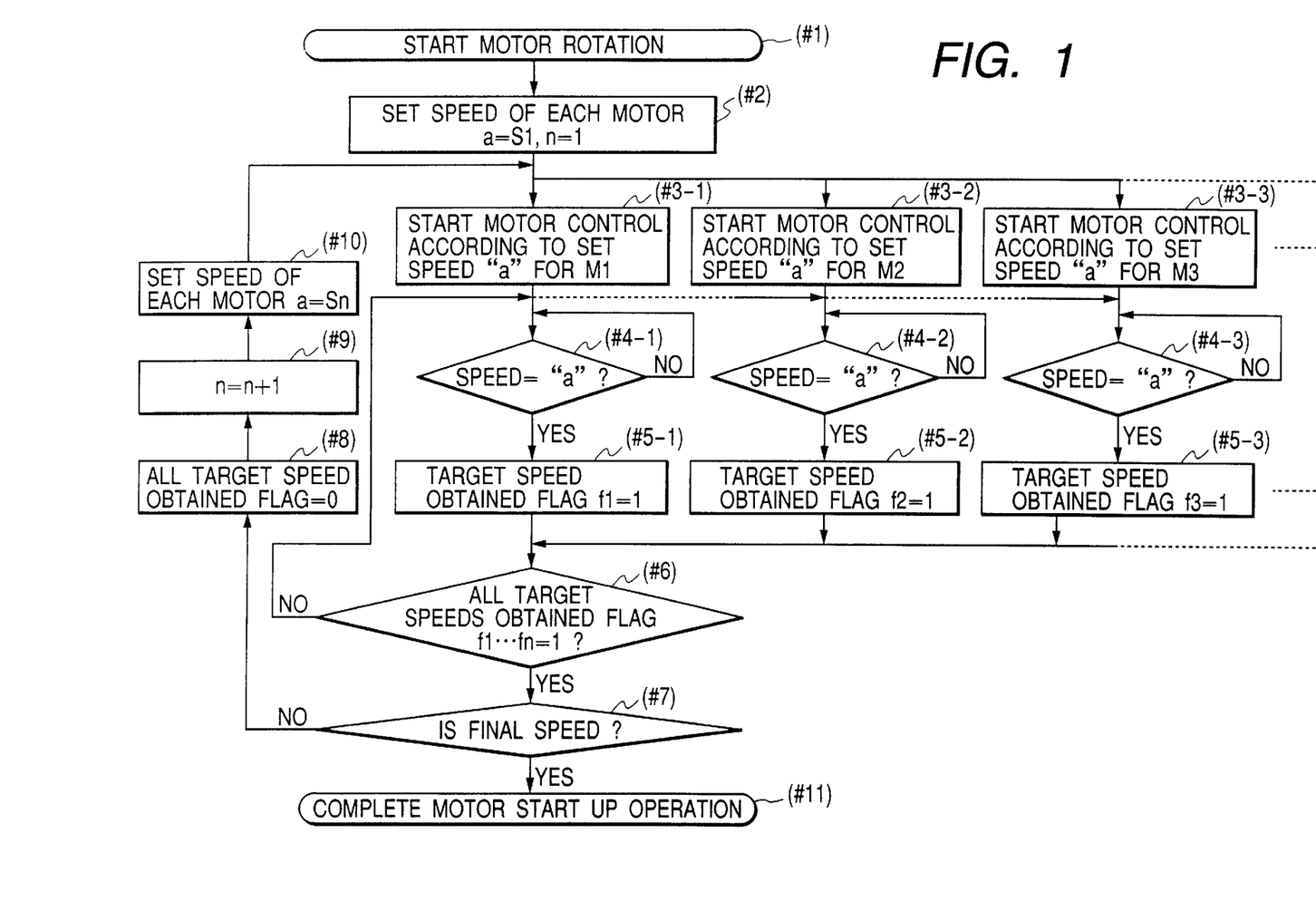
FIG. 1 is a flow chart showing the start up operation according to the first embodiment of the present invention.
Figure 2:
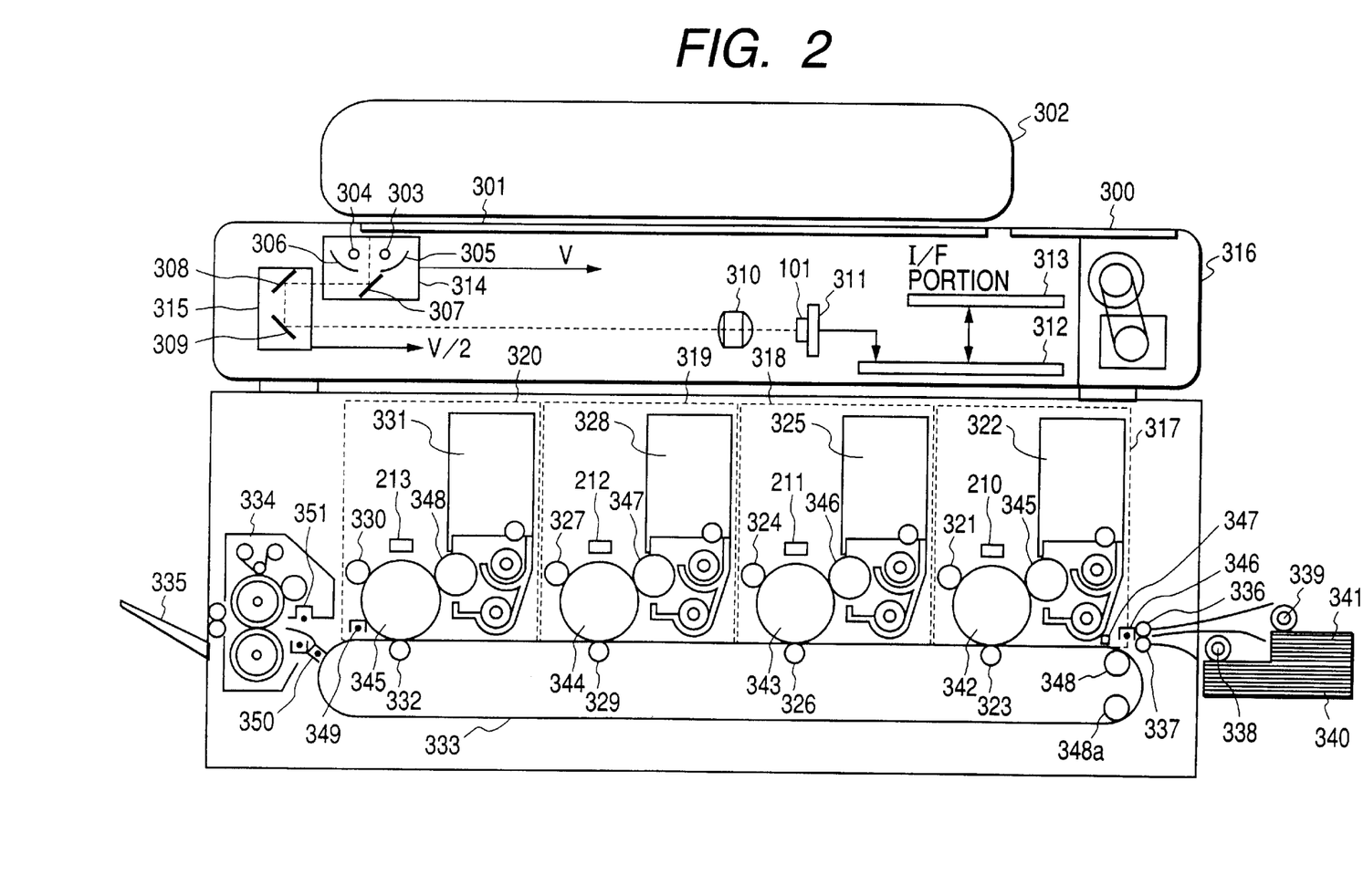
FIG. 2 is a schematic sectional view of a color image forming apparatus according to the first embodiment of the present invention.

FIGS. 1 and 2 show the first embodiment of the present invention.

FIG. 2 shows the schematic arrangement of the overall color image forming apparatus, and the arrangement of a color reader unit will be explained first.

The color reader unit comprises a CCD 101, a circuit board 311 on which the CCD 101 is mounted, a printer processor 312, an original table glass (platen) 301, a document feeder 302 (a mirror surface pressing plate (not shown) may be attached in place of the document feeder 302), light sources 303 and 304 such as halogen lamps, fluorescent lamps, or the like for illuminating an original, reflectors 305 and 306 for focusing light beams emitted by the light sources 303 and 304 onto an original, mirrors 307 to 309, a lens 310 for focusing light reflected or projected by an original onto the CCD 101, a carriage 314 which carries the halogen lamps 303 and 304, reflectors 305 and 306, and mirror 307, a carriage 315 which carries the mirrors 308 and 309, and an interface (I/F) 313 with another IPU, and the like. Note that the carriages 314 and 315 mechanically move in a direction perpendicular to the electric scanning (main scanning) direction of the CCD 101 respectively at speeds V and V/2, thus scanning (sub-scanning) the entire surface of an original.

The arrangement of a printer unit in FIG. 2 will be explained below. The printer unit is comprised of a magenta (M) image forming module 317, a cyan (C) image forming module 318, a yellow (Y) image forming module 319, and a black (K) image forming module 320. Since these image forming modules have the same arrangement, the M image forming module 317 will be described in detail below, and a detailed description of other image forming modules will be omitted.

The M image forming module 317 comprises a photosensitive drum 342 on the surface of which a latent image is formed by light coming from an LED array 210. A primary charging device 321 charges the surface of the photosensitive drum 342 to a predetermined potential to prepare for latent image formation. A developing device 322 develops a latent image formed on the surface of the photosensitive drum 342 to form a toner image. Note that the developing device 322 includes a sleeve 345 for applying a developing bias upon development.

A transfer charging device 323 discharges from the back surface of a transfer element conveyor belt 333 to transfer a toner image on the surface of the photosensitive drum 342 onto a recording sheet or the like on the transfer element conveyor belt 333. This embodiment has no cleaner due to high transfer efficiency. However, a cleaner may be mounted thereon.

A process for transferring a toner image onto a transfer element, such as a recording sheet, will be explained below. Transfer elements such as recording sheets or the like stored in a cassette 340 or 341 are picked up, one-by-one, by a pickup roller 339 or 338, and the picked-up transfer element is fed onto the transfer element conveyor belt 333 via paper feed rollers 336 and 337. The fed recording sheet is charged by an attraction charging device 346. A transfer element conveyor belt roller 348 drives the transfer element conveyor belt 333 and charges a recording sheet or the like together with the attraction charging device 346 to make the transfer element conveyor belt 333 attract the recording sheet or the like. Note that the transfer element conveyor belt roller 348 may serve as a driving roller for driving the transfer element conveyor belt 333, or a driving roller for driving the transfer element conveyor belt 333 may be placed on the opposite side. Also, a driving roller 348a may be located in the vicinity of the roller 348.

A sheet leading end sensor 347 detects the leading end of a recording sheet or the like on the transfer element conveyor belt 333. Note that the detection signal output from the sheet leading end sensor 347 is sent from the printer unit to the color reader unit, and is used as a sub-scanning synchronization signal upon sending a video signal from the color reader unit to the printer unit.

The recording sheet or the like is then conveyed by the transfer element conveyor belt 333, and toner images are formed on its surface in the order of M, C, Y, and K in the image forming modules 317 to 320. The transfer element, such as a recording sheet or the like, that has left the K image forming module 320 is subjected to charge removal in a charge removing device 349 so as to easily peel off from the transfer element conveyor belt 333, and is then peeled from the transfer element conveyor belt 333. A peeling charging device 350 prevents image disturbance by peeling charge removal upon peeling the recording sheet or the like from the transfer element conveyor belt 333. The peeled recording sheet or the like is charged by pre-fixing charging devices 351 and 352 to compensate for the toner attraction force and to prevent image disturbance, and is then supplied to a fixing device 334 to thermally fix the toner images formed thereon. The recording sheet or the like is then exhausted onto an exhaust tray 335.

Note that this embodiment uses vibration-type motors as driving motors for rotating the photosensitive drums 342 to 345, and also uses a vibration-type motor as a driving motor for rotating the driving roller for driving the transfer element conveyor belt 333.

To restate the description of this embodiment, the vibration-type motor exploits a plurality of vibrations excited in a vibration member at frequencies normally in the ultrasonic range (i.e., the vibration member is vibrated by applying a periodic signal to an electromechanical energy conversion element on the vibration member in which the electro-mechanical energy conversion element, such as a piezoelectric member or the like, is located on an elastic member so as to obtain a driving force). The driving frequency and driving voltage, and the pulse width of the driving voltage are controlled in accordance with a speed detection signal which is detected by a speed sensor for detecting the driving speed of each motor and is used for stably rotating the motor at a constant speed.

Figure 3:
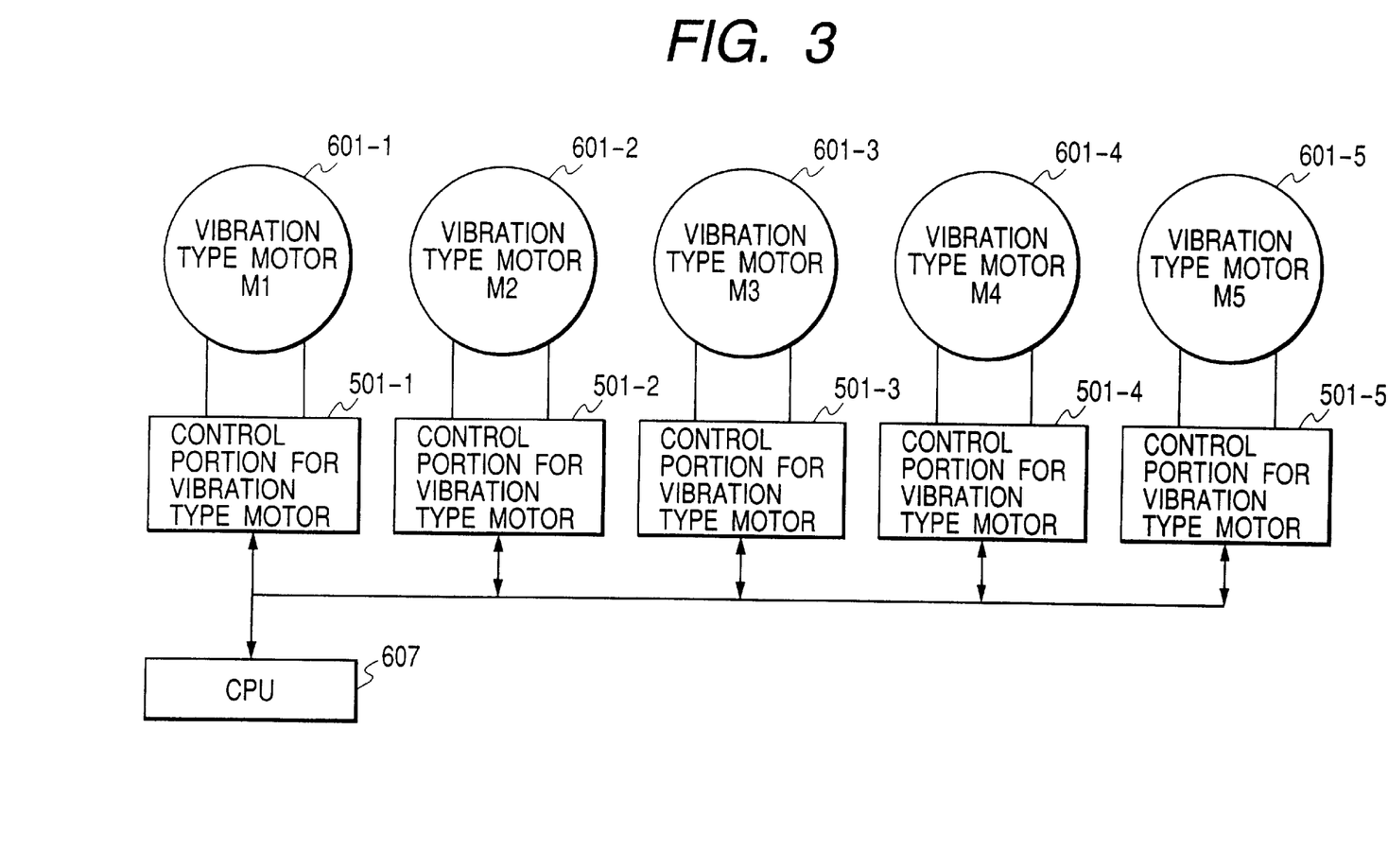
FIG. 3 is a block diagram of a driving circuit for a plurality of vibration type motors according to the first embodiment of the present invention.

FIG. 1 shows the control flow of the vibration type motors. FIG. 3 shows the control blocks of the vibration-type motors in this embodiment, and FIG. 4 shows a control portion for one vibration type motor.

In this embodiment, vibration-type motors 601-1 to 601-4 (M1 to M4) are used to drive the photosensitive drums, and a vibration-type motor (M5) 601-5 is used to drive the transfer element conveyor belt.

Figure 5:
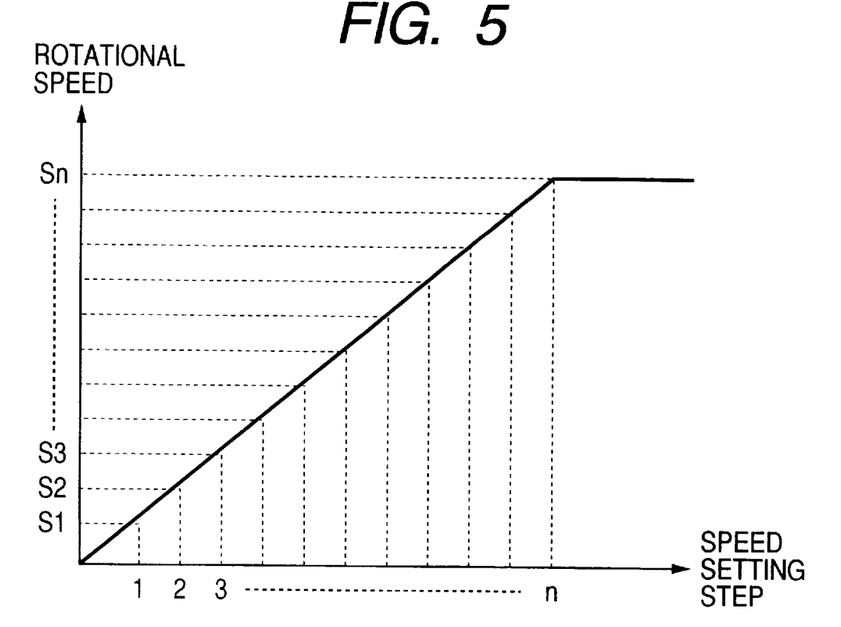
FIG. 5 is a graph showing the relationship between the n-divided target speeds and speed setting steps in the start up operation shown in FIG. 1.

In this embodiment, the start-up process from the beginning of the start-up operation, until a steady speed (final target speed) is reached, is divided into n steps (n is an integer within the range $n \geq 2$), and Sn represents the divided target speed (prescribed speed value), as shown in FIG. 5.

Figure 4:
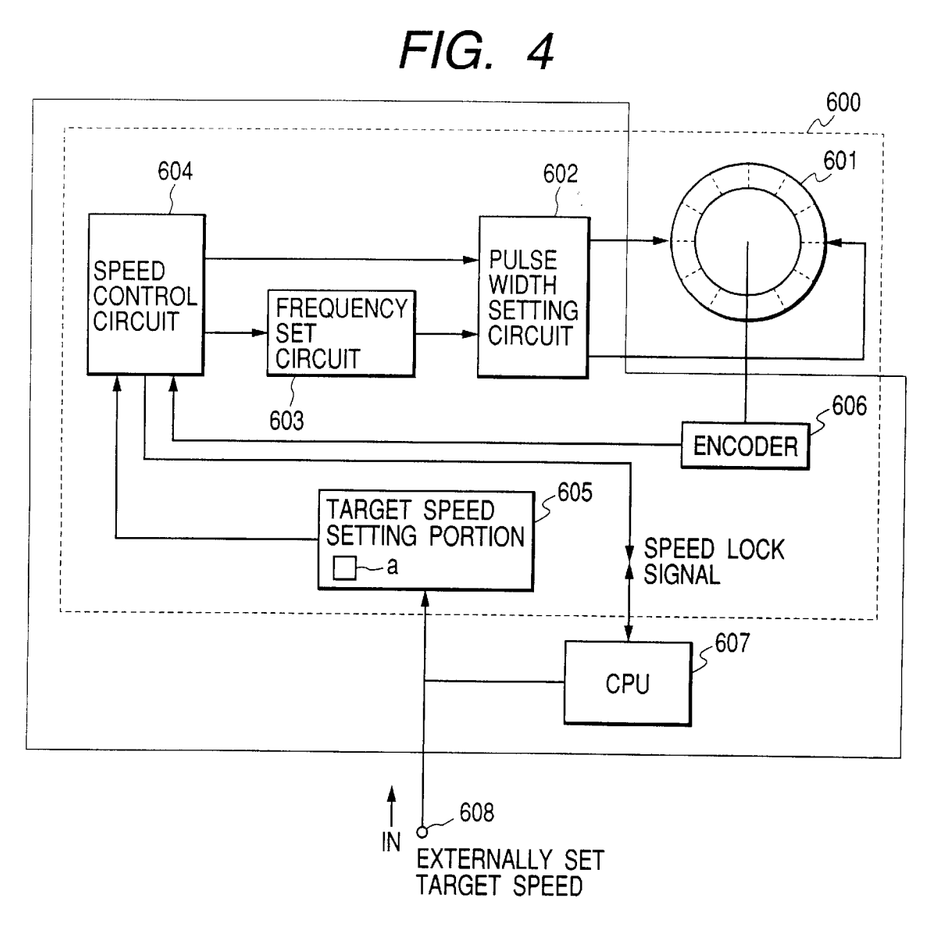
FIG. 4 is a block diagram of a control portion for the vibration type motor shown in FIG. 3.

FIG. 4 shows a control portion 600 for each vibration-type motor. A target rotational speed is set in memory a of a target speed setting portion 605 by an externally set target speed 608. A speed control circuit 604 issues commands to a pulse-width setting circuit 602 and frequency setting circuit 603 on the basis of speed information from the target speed setting portion 605 and a signal output from an encoder 606 attached onto the shaft of the vibration type motor 601. The pulse width setting circuit 602 generates pulses for controlling the vibration type motor 601 on the basis of the command from the speed control circuit 602 and information from the frequency setting circuit 603 so as to control the rotational speed of the vibration-type motor.

When the rotation locks at the target speed, the speed control circuit 604 outputs a speed lock signal to a CPU 607 for controlling all the vibration type motors, and the CPU 607 checks if the rotation has locked at the target speed. Note that the control portion 600 mentioned above is provided for each of the motors, as shown in FIG. 3 (501-1 to 501-5).

FIG. 1 is a flow chart showing the start up operation of all the vibration-type motors (M1 to M5) by the CPU 607.

Note that the rotational speeds of the motors are controlled to set equal peripheral speeds of the four photosensitive drums since these photosensitive drums have equal outer diameters. The speed control of the motor for driving the transfer element conveyor belt is to make the peripheral speed of the transfer element conveyor belt 333 equal to that of each photosensitive drum.

Referring to FIG. 1, if a motor rotation start request is issued (#1), the CPU 607 sets speeds in the control portions 501-1 to 501-5 for vibration-type motors shown in FIG. 3 (#2).

The speeds set in step #2 are stored in the corresponding memories a, and each control portion for vibration-type motor makes speed control in accordance with the value stored in its memory a. In the first step of the start-up operation, the first target speed S1 is supplied to each motor. The control portions for vibration-type motors then start the start-up processing of the corresponding vibration-type motors.

In this embodiment, upon starting up each vibration-type motor, the rotational speed is controlled in accordance with a signal output from the encoder 606 attached to the vibration type motor while gradually decreasing the frequency from a predetermined frequency, and the driving frequency and driving pulses are controlled to attain a prescribed speed Sn. When the predetermined speed (prescribed speed) is reached, the speed control circuit 604 outputs a speed lock signal, and the CPU 607 can detect, based on this signal, that the speed of that motor has reached the predetermined speed.

Speed control is executed so that each motor reaches its setting speed a as the divided target speed (#3-1, #3-2, #3-3, . . . ), and it is checked if the speed of each motor has reached the setting speed (#4-1, #4-2, #4-3, . . . ). If the speed of each motor has reached the setting speed, speed obtained flags f1, f2, f3, . . . , fn of the individual motors are set at 1 to indicate that the setting speed has been reached (#5-1, #5-2, #5-3, . . . ), and the method then advances to step #6.

It is checked in step #6 if all the speed obtained flags f1 to f5 are 1. If NO in step #6, the method returns to steps #4-1, . . . to repeat the aforementioned operations until all the speed obtained flags become 1.

If all the speed obtained flags are 1, since all the motors are rotation-controlled at the same divided target speed, it is checked in step #7 if the current target speed is the final speed.

If it is determined in step #7 that the current target speed is not the final speed, all the speed obtained flags are set at 0 to execute speed control at the next divided target speed (#8). The divided target speed is incremented by one step (n+1) (#9), and the speeds of the individual motors are set (a=Sn; #10) to set the next target speed Sn=S2 in each motor. The method then advances to steps #3-1, #3-2, #3-3, . . . to repeat the same operations.

On the other hand, if it is determined in step #7 that the current target speed is the final speed, the method advances to step #11 to complete the motor start up operation.

More specifically, even when an alternating signal as a driving signal, e.g., a driving pulse signal of an identical frequency, is applied, all the motors do not always rotate at an equal speed due to individual differences of the vibration-type motors. However, the speed range until the final target speed (equal for all the motors) of each motor is divided into n steps, and the speed of each motor is controlled to reach a target speed in each divided step. After the speeds of all the motors have reached the target speed, the next speed control is made stepwise to attain the next target speed. In this way, a final target speed equal for all the motors can be easily obtained, and all the motors can be started up to the final steady speed via nearly the same speeds. In this embodiment, during this start up operation, the transfer element conveyor belt 333 is separated from each photosensitive drum.

Under the control of this embodiment described above, the motor speeds change, as shown in FIG. 6. The one-dashed chain curve in FIG. 6 indicates the speed characteristics of a vibration-type motor with the lowest response speed, and the solid curve indicates those with a higher response speed. With this control, the speed difference can be minimized compared to the conventional speed control shown in FIG. 10.

Figure 6:
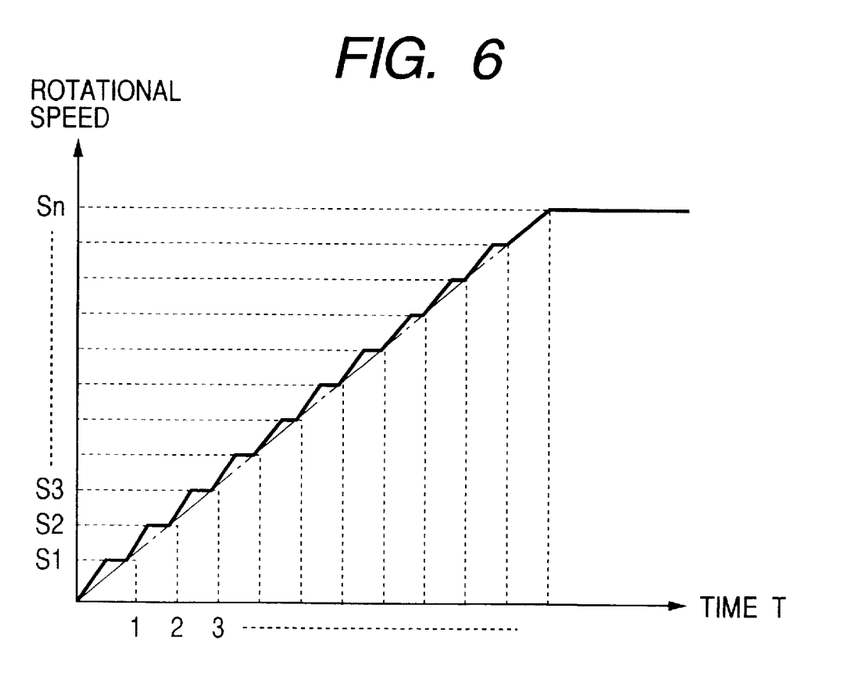
FIG. 6 is a graph showing the relationship between the rotational speeds and the speed setting steps in the control according to the start up flow chart in FIG. 1.

In the first embodiment described above, all the motors to be controlled are vibration-type motors. However, even when vibration-type motors and DC motors are used together, the motor speeds change, as shown in FIG. 6, as in the first embodiment.

Figure 7:
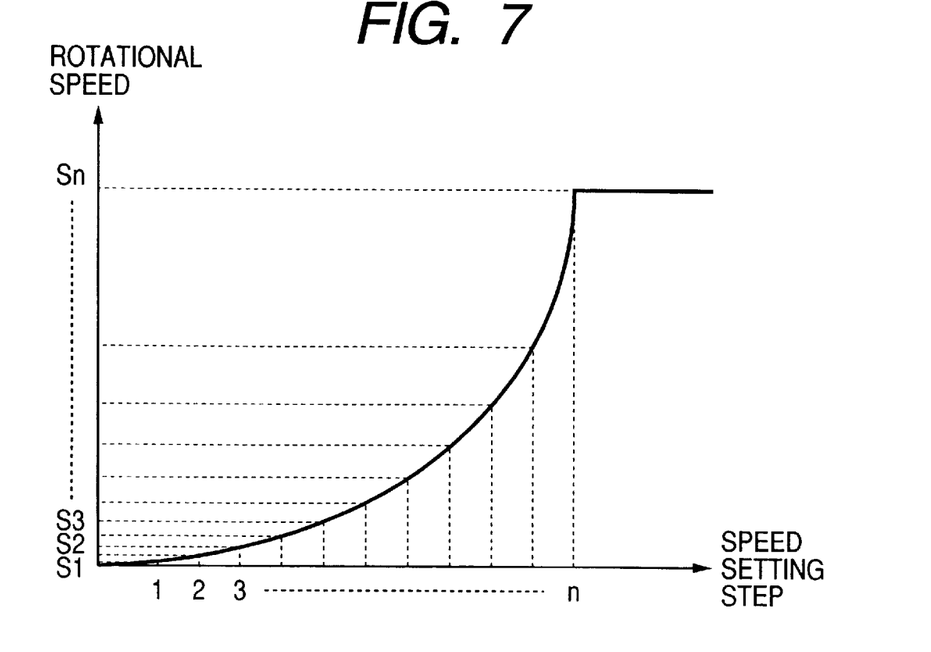
FIG. 7 is a graph showing the relationship between the n-divided target speeds and speed setting steps in start-up operation according to another embodiment of the present invention.
Figure 8:
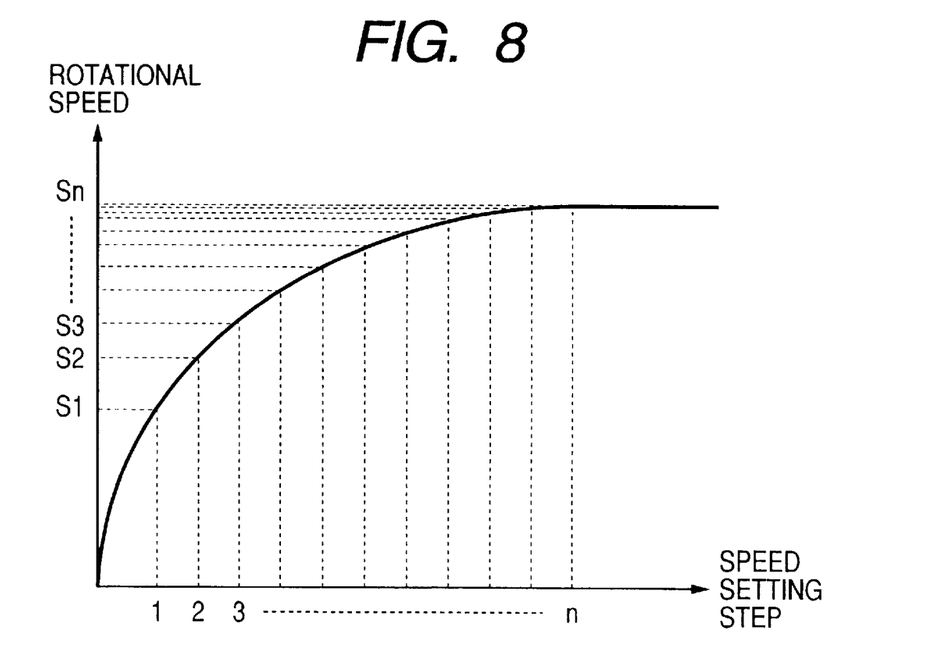
FIG. 8 is a graph showing the relationship between the n-divided target speeds and speed setting steps in start-up operation according to another embodiment of the present invention.
Figure 9:
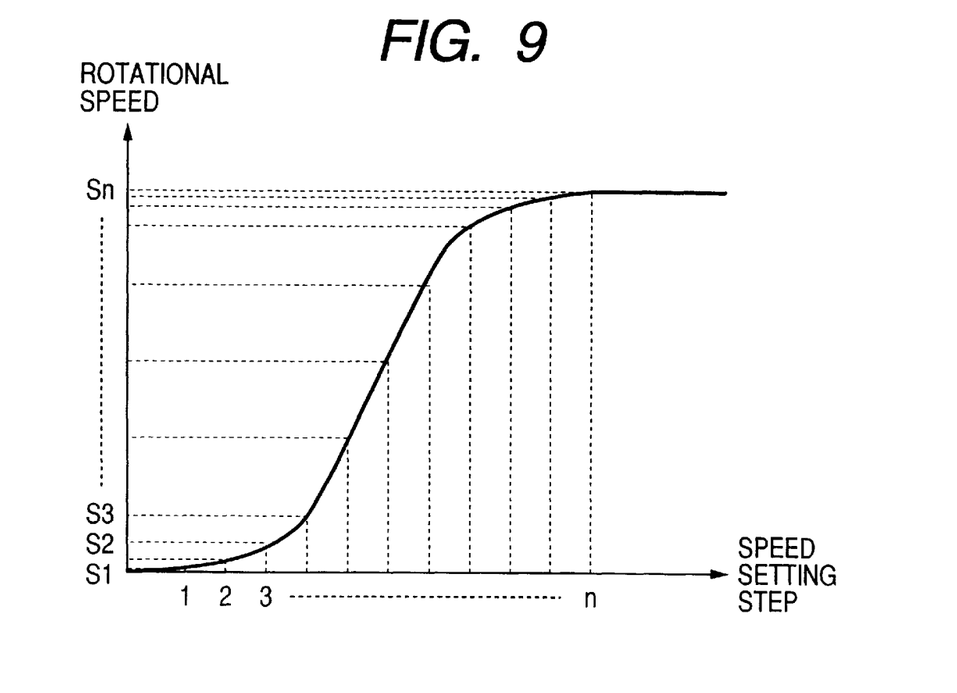
FIG. 9 is a graph showing the relationship between the n-divided target speeds and speed setting steps in start-up operation according to another embodiment of the present invention.

In the first embodiment, the motor start up curve changes linearly, but may change nonlinearly, as shown in FIGS. 7, 8, and 9. That is, vibration-type motors have different start-up characteristics depending on their sizes and control methods. For this reason, when the start-up characteristics are changed in correspondence with characteristics to minimize speed differences in the start-up characteristics of a plurality of motors, speed control can be easily attained.

In FIG. 7, divided target speeds at lower speeds are set finely for a motor with poor start-up characteristics at lower speeds. In FIG. 8, divided target speeds at higher speeds are set finely for a motor with poor start up characteristics at higher speeds. Furthermore, in FIG. 9, divided target speeds at lower and higher speeds are set finely for a motor with poor start-up characteristics at both the lower and higher speeds.

In the aforementioned embodiments, the driving speed of each motor and that of the element to be driven are in the ratio of 1:1. However, when a variable speed mechanism is inserted, the setting speed changes in correspondence with the variable speed ratio of each element to be driven to minimize any speed differences of the element to be driven. In the above embodiment, a common setting speed value is set in each motor. If the drums have different outer diameters, their peripheral speeds are different even when the motors rotate at an equal speed. For this reason, the target speed is set in units of motors.

The above embodiment has exemplified speed control upon starting up five motors. For example, the present invention can also be applied to a case wherein a steady speed (final target speed) is changed like in a case wherein the image forming process speed in the image forming apparatus is changed.

Furthermore, DC motors and vibration-type motors may be controlled together.

To recapitulate, when the speed setting range Sn up to the final speed is divided into n steps (n≧2) upon executing speed control of vibration-type motors, DC motors, or AC motors, the range between the lowest speed S1 and final speed Sn is divided into n steps with reference to the lowest speed that assures stable rotation of all the motors, and the next speed setting value is supplied to the motors after all the motors have reached the speed setting value. In this way, the motor start-up operations that can assure start-up characteristics at the lowest speed with a low cost and can minimize speed differences can be realized. Since speed differences among motors upon motor start-up are minimized, wear of elements to be driven, produced by speed differences, can be reduced.

What is claimed is:

1. A motor driving apparatus for simultaneously driving a plurality of motors, comprising:
    a target speed setting circuit for setting a speed up to a target speed set for the motors by sequentially selecting a plurality of divided speeds obtained by dividing a speed range up to the target speed into N speeds, wherein N is an integer and N≧2;
    a speed control circuit for controlling the speeds of the motors to be the speed set by said target speed setting circuit; and
    a changing circuit for changing the speed set by said target speed setting circuit to the next divided speed after the speed of all the motors has reached the set speed.

2. An apparatus according to claim 1, wherein the speed set by said target speed setting circuit makes the speeds of members to be driven by the motors equal to each other.

3. An apparatus according to claim 2, wherein the speeds of the members to be driven are peripheral speeds of the members to be driven.

4. An apparatus according to claim 1, wherein all the motors are vibration-type motors.

5. An apparatus according to claim 1, wherein the plurality of motors include a combination of vibration-type motors and other types of motors.

6. An apparatus according to claim 1, wherein the speed range divided to produce the divided speeds is divided unevenly.

7. An apparatus according to claim 4, wherein said speed control circuit has a detection circuit for detecting a driving speed, a comparator for comparing the speed detected by said detection circuit and the speed set by said target speed setting circuit, and a frequency changing circuit for changing a frequency of a periodic signal to be applied to the vibration-type motors in accordance with a comparison result of the comparator until the detected speed matches the setting speed.

8. An apparatus according to claim 1, wherein said target speed setting circuit sets speeds in units of motors, and said speed control circuit controls the speeds of the motors up to the speeds set in units of motors.

9. An apparatus according to claim 2, wherein said target speed setting circuit sets speeds in units of motors, and said speed control circuit controls the speeds of the motors up to the speeds set in units of motors.

10. An apparatus according to claim 3, wherein said target speed setting circuit sets speeds in units of motors, and said speed control circuit controls the speeds of the motors up to the speeds set in units of motors.

11. A motor driving apparatus for simultaneously driving a plurality of motors, comprising:

a target speed setting circuit for setting a speed up to a target speed set for the motors by sequentially selecting a plurality of divided speeds obtained by dividing a speed range up to the target speed into N speeds, wherein N is an integer and N≧2;
    an encoder provided for each of the motors, detecting the speed of each motor;
    a comparator for receiving a signal from said encoder, and comparing the speed set by said target speed setting circuit and a speed corresponding to the signal received from said encoder in units of motors;
    a driving circuit for applying driving signals to the motors;
    a control circuit for changing the driving signals output from said driving circuit until the comparator detects by performing its comparison operation that the speed corresponding to the signal output from said encoder matches the set speed;
    a detector for detecting the comparison result of said comparator to detect if speeds corresponding to the signals from said encoder for all the motors match the set speed, and for generating an output when the speeds corresponding to the encoder signals match the set speed; and
    a changing unit for changing the divided speed of said target speed setting circuit in response to the output from said detector.

12. An apparatus according to claim 11, wherein the speed set by said target speed setting circuit makes the speeds of members to be driven by the motors equal to each other.

13. An apparatus according to claim 12, wherein the speeds of the members to be driven are peripheral speeds of the members to be driven.

14. An apparatus according to claim 11, wherein all the motors are vibration-type motors.

15. An apparatus according to claim 11, wherein the plurality of motors include a combination of vibration-type motors and other types of motors.

16. An apparatus according to claim 11, wherein the divided speeds are divided unevenly.

17. An apparatus according to claim 11, wherein the speed range divided to produce the divided speeds is divided evenly.

18. An image forming apparatus, which comprises a motor driving apparatus for simultaneously driving a plurality of motors, comprising:
    a target speed setting circuit for setting a speed up to a target speed set for the motors by sequentially selecting a plurality of divided speeds obtained by dividing a speed range up to the target speed into N speeds wherein N is an integer and N≧2;
    a speed control circuit for controlling the speeds of the motors to the speed set by said target speed setting circuit;
    a changing circuit for changing the speed set by said target speed setting circuit to the next divided speed after the speed of all the motors has reached the set speed; and
    members to be driven by the motors to form images.

19. An apparatus according to claim 18, wherein the speed set by said target speed setting circuit makes the speeds of said members to be driven by the motors equal to each other.

20. An apparatus according to claim 19, wherein the speeds of said members to be driven are peripheral speeds of the members to be driven.

21. An apparatus according to claim 18, wherein all the motors are vibration type motors.

22. An apparatus according to claim 18, wherein the plurality of motors include a combination of vibration-type motors and other types of motors.

23. An apparatus according to claim 18, wherein the speed range divided to produce the divided speeds is divided unevenly.

24. An apparatus according to claim 21, wherein said speed control circuit has a detection circuit for detecting a driving speed, a comparator for comparing the speed detected by said detection circuit and the speed set by said target speed setting circuit, and a frequency changing circuit for changing a frequency of a periodic signal to be applied to the vibration-type motors in accordance with a comparison result of the comparator until the detected speed matches the set speed.

25. An apparatus according to claim 18, wherein said target speed setting circuit sets speeds in units of motors, and said speed control circuit controls the speeds of the motors up to the speeds set in units of motors.

26. An apparatus according to claim 19, wherein said target speed setting circuit sets speeds in units of motors, and said speed control circuit controls the speeds of the motors up to the speeds set in units of motors.

27. An apparatus according to claim 20, wherein said target speed setting circuit sets speeds in units of motors, and said speed control circuit controls the speeds of the motors up to the speeds set in units of motors.

28. An apparatus according to claim 18, wherein said image forming apparatus is a copying machine, and the members to be driven are drums.

29. An apparatus according to claim 18, wherein said image forming apparatus is a copying machine, the members to be driven are drums and a conveyor belt, and the plurality of motors include a combination of vibration-type motors and other types of motors.

* * * * *

UNITED STATES PATENT AND TRADEMARK OFFICE
CERTIFICATE OF CORRECTION

PATENT NO. : 6,114,818

DATED : September 5, 2000

INVENTOR(S): TOSHIHIKO OHTSUBO, ET AL.

It is certified that error appears in the above-identified patent and that said Letters Patent is hereby corrected as shown below:

Column 1:
Line 18, "element" should read –element,--.
Line 19, "like" should read –like,--.
Line 24, "motors, which" should read –motors that--.
Line 34, "vibration type" should read –vibration-type--.
Line 42, "vibration type" should read –vibration-type--.
Line 46, "vibration type" should read –vibration-type--.
Line 65, "wears" should read –wear--.
Line 66, "start up" should read –start-up--.

Column 2:
Line 6, "start up" should read --start-up--, and "start" should read –start- --.
Line 15, "One" should read –another--.
Line 22, "One" should read –Still another--.
Line 23, "controlling" should read –controlling the--.
Line 27, ranges" should read –ranges,--.
Line 27, "speed" should read –speed,--.
Line 38, "start up" should read –start-up--.
Line 45, "vibration type" should read –vibration-type--.
Line 48, "vibration type" should read –vibration-type--.
Line 50, "start up" should read –start-up--.
Line 54, "start up" should read –start-up--.

UNITED STATES PATENT AND TRADEMARK OFFICE
CERTIFICATE OF CORRECTION

PATENT NO. : 6,114,818
DATED : September 5, 2000
INVENTOR(S): TOSHIHIKO OHTSUBO, ET AL.

It is certified that error appears in the above-identified patent and that said Letters Patent is hereby corrected as shown below:

Column 3:
Line 1, "start up" should read --start-up--.
Line 16, "304" should read --304,--.

Column 4:
Line 40, "electromechanical" should read --electro-mechanical--.
Line 50, "vibration type" should read --vibration-type--.
Line 51, "blocks-of" should read --blocks of--.

Column 5:
Line 3, "vibration type" should read --vibration-type--.
Line 5, "vibration type" should read --vibration-type--.
Line 15, "start up" should read --start-up--.

Column 6:
Line 6, "start up" should read --start-up--.
Line 46, "start up" should read --start-up--.
Line 55, "th e" should read --the--.

UNITED STATES PATENT AND TRADEMARK OFFICE
CERTIFICATE OF CORRECTION

PATENT NO. : 6,114,818

DATED : September 5, 2000

INVENTOR(S): TOSHIHIKO OTHSUBO, ET AL.

It is certified that error appears in the above-identified patent and that said Letters Patent is hereby corrected as shown below:

<u>Column 8</u>:
Line 50, "speeds" should read --speeds,--.
Line 67, "vibration type" should read --vibration-type--.

Signed and Sealed this

Twenty-ninth Day of May, 2001

Attest:

NICHOLAS P. GODICI

Attesting Officer

Acting Director of the United States Patent and Trademark Office